US010187538B2

(12) United States Patent
Yamashita

(10) Patent No.: US 10,187,538 B2
(45) Date of Patent: Jan. 22, 2019

(54) INFORMATION PROCESSING APPARATUS, METHOD FOR CONTROLLING INFORMATION PROCESSING APPARATUS, AND PROGRAM HAVING PREDETERMINED EVENT OCCURRING DURING SHIFTING PROCESS OF POWER STATE

(71) Applicant: CANON KABUSHIKI KAISHA, Tokyo (JP)

(72) Inventor: Takahiro Yamashita, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/847,327

(22) Filed: Dec. 19, 2017

(65) Prior Publication Data
US 2018/0183963 A1 Jun. 28, 2018

(30) Foreign Application Priority Data

Dec. 27, 2016 (JP) ................. 2016-252281

(51) Int. Cl.
*G06F 15/00* (2006.01)
*G06F 1/00* (2006.01)
*G06K 15/00* (2006.01)
*H04N 1/00* (2006.01)
*G06F 3/12* (2006.01)
*G05B 15/02* (2006.01)

(52) U.S. Cl.
CPC ....... *H04N 1/00896* (2013.01); *G06F 3/1212* (2013.01); *G06F 3/1221* (2013.01); *G06F 3/1229* (2013.01); *G06F 3/1288* (2013.01); *G05B 15/02* (2013.01); *H04N 2201/0094* (2013.01)

(58) Field of Classification Search
CPC ........ H04N 1/00896; H04N 2201/0094; G06F 3/1212; G06F 3/1221; G06F 3/1229; G06F 3/1288; G05B 15/02
USPC ............................... 358/1.13, 1.14, 1.15, 1.1
See application file for complete search history.

(56) References Cited

U.S. PATENT DOCUMENTS

2016/0277619 A1* 9/2016 Asai .................... H04N 1/00896
2017/0111534 A1* 4/2017 Tsuzuki ............. H04N 1/00891

FOREIGN PATENT DOCUMENTS

JP 2015-005236 A 1/2015

* cited by examiner

*Primary Examiner* — Douglas Tran
(74) *Attorney, Agent, or Firm* — Canon U.S.A., Inc. IP Division

(57) ABSTRACT

When an event serving as a restoration factor occurs during a suspending process, a central processing unit (CPU) of a multifunctional peripheral (MFP)) reserves restoration to a power control unit and stores the event in a factor-event storage unit. In the suspend mode, if the restoration is reserved, the power control unit resumes power supply to a predetermined module. In the resuming process, the CPU restores the MFP, and in the case where a factor event is stored in the factor-event storage unit, the CPU controls the energization state of the MFP according to the factor event.

20 Claims, 14 Drawing Sheets

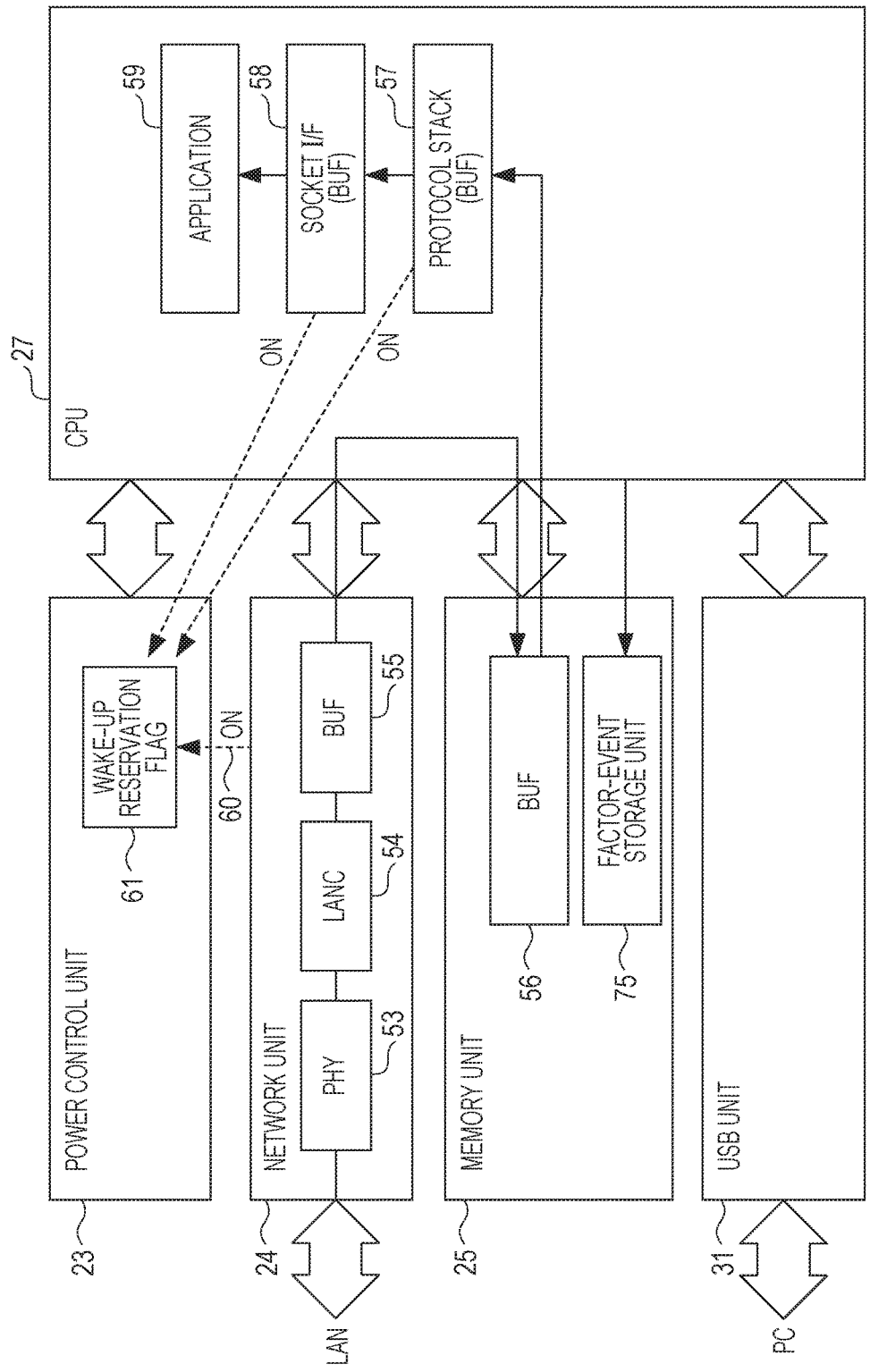

FIG. 9

| WAKE-UP FACTOR EVENT | EVENT ID 901 | SCANNER UNIT 11 | PRINTER UNIT 13 | OPERATING UNIT 15 | HDD 26 |
|---|---|---|---|---|---|
| WAKE-UP FACTOR RESERVATION | 0 | OFF | OFF | OFF | OFF |
| PRINT INSTRUCTION | 1 | OFF | ON | OFF | ON |
| NETWORK COMMUNICATION | 2 | OFF | OFF | OFF | OFF |
| FAX RECEPTION | 3 | OFF | OFF | OFF | OFF |
| WAKE-UP TIME | 4 | OFF | OFF | OFF | OFF |
| RECEPTION VIA USB | 5 | OFF | ON | OFF | ON |
| POWER-SAVING KEY | 6 | ON | ON | ON | ON |
| PROXIMITY DETECTION | 7 | ON | ON | ON | ON |
| DOCUMENT DETECTION | 8 | ON | ON | ON | ON |
| OPEN/CLOSE DETECTION | 9 | ON | ON | ON | ON |

INFORMATION PROCESSING APPARATUS, METHOD FOR CONTROLLING INFORMATION PROCESSING APPARATUS, AND PROGRAM HAVING PREDETERMINED EVENT OCCURRING DURING SHIFTING PROCESS OF POWER STATE

BACKGROUND OF THE INVENTION

Field of the Invention

The present disclosure relates to control of information processing apparatuses, such as image forming apparatuses operable in a plurality of power states.

Description of the Related Art

Some recent image forming apparatuses have a suspending function (suspend mode) in which power consumption is reduced when not in use by suspending the operation of a program, and in which an operation state before the suspension is stored in a memory so that the apparatus can restore the same operation state as that before the suspension. By segmenting this concept to apply no power also to individual devices (a hard disk and so on) constituting the apparatus when not in use, wasteful power consumption is reduced while keeping functionality.

Some image forming apparatuses have a function called resuming for restoring a state immediately before suspension when a power control circuit detects a wake-up factor in the suspend mode. Examples of the wake-up factor include a key operation on a control panel, a timer interrupt, and network packet reception. In the resuming operation, the energization state of each device after the resuming is controlled on the basis of the wake-up factor. For example, in the case of restoration by a key operation, the control panel is energized, while for a network packet, the control panel is not energized. Thus, only a device that can be used on the basis of the factor can be energized; for example, in the case of a network packet factor which is highly likely to be operated by the user by remote control, the operating unit is not energized, whereas in the case of an operating-unit-key depression factor, the operating unit is energized.

Japanese Patent Laid-Open No. 2015-005236 proposes a technique of using a wake-up reservation flag as a wake-up factor. If a wake-up factor is generated immediately before the system shifts to a suspend mode, a resuming process needs to be performed immediately after suspension is completed in order to process the factor. In the technique disclosed in Japanese Patent Laid-Open No. 2015-005236, if a wake-up factor is generated immediately before the apparatus shifts to a suspend mode, a wake-up reservation flag is set in a predetermined register on a power control circuit so that a resuming process can be started immediately after the suspension is completed.

However, the above technique in the relate art can cause the energization state of each device after restoration to differ from the energization state determined from the wake-up factor event that triggered the reservation. For that reason, power is supplied also to devices other than a device corresponding to the wake-up factor event that triggered the reservation, resulting in wasteful power consumption, or can delay supply of power to a necessary device, increasing the waiting time of the user. For example, although the wake-up factor event that triggered the reservation is reception of a print job, the operating unit can be supplied with power, but the printing unit cannot be supplied with power.

SUMMARY OF THE INVENTION

The present disclosure provides a mechanism for restoring a power state determined from a wake-up factor event that triggered wake-up reservation even when the device is woken up by wake-up reservation.

The present disclosure provides an information processing apparatus having a power state which includes at least a first power state and a second power state in which less power is consumed than in the first power state. The information processing apparatus includes a control unit and a power control unit. The control unit is configured to perform a shifting process for shifting the power state from the first power state to the second power state. The power control unit is configured to control processing so as to supply power to a module based on a predetermined event generated in the second power state. The module corresponds to the predetermined event. When the predetermined event occurs during the shifting process, the control unit stores information indicating the predetermined event in a storage unit and continues the shifting process. After shifting the power state to the second power state, the power control unit controls processing so as to supply power to the module corresponding to the predetermined event based on the information stored in the storage unit.

Further features of the disclosure will become apparent from the following description of exemplary embodiments with reference to the attached drawings.

BRIEF DESCRIPTION OF THE DRAWINGS

FIG. 5 is a diagram illustrating the periphery of the power control unit and a CPU in more detail.

FIG. 9 is a table listing the energization state of each device of each wake-up factor after resuming.

DESCRIPTION OF THE EMBODIMENTS

Embodiments of the present disclosure will be described hereinbelow with reference to the drawings.

First Embodiment

Figure 1:
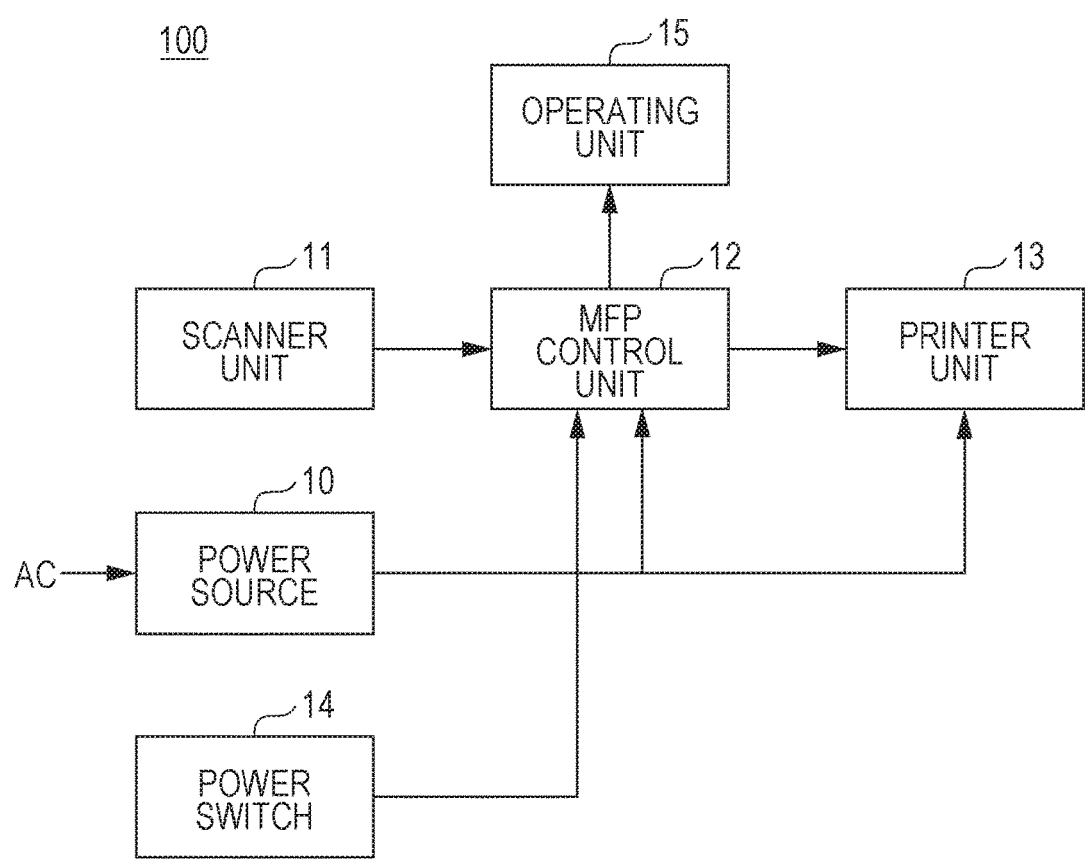
FIG. 1 is a diagram illustrating, in outline, the configuration of an image forming apparatus according to an embodiment of the present disclosure.

FIG. 1 is a diagram illustrating, in outline, the configuration of an image forming apparatus, which is an embodiment of an information processing apparatus of the present disclosure.

An image forming apparatus 100 (hereinafter referred to as "MFP") of the present embodiment has multi-functions including a copy function, a printer function, and a scanner function.

As illustrated in FIG. 1, the multifunction peripheral (MFP) 100 includes a MFP control unit 12, a printer unit 13, a scanner unit 11, a power source 10, and a power switch 14.

The MFP control unit 12 controls the entire MFP 100. The printer unit 13 performs image processing by, for example, an electrophotographic method. The scanner unit 11 optically reads an image from a document and converts the image to a digital image. The power source 10 supplies power to the components of the MFP 100. The operating unit 15 is used to operate the MFP 100. The power switch 14 is used for the user to turn on/off the power source of the MFP 100. The power state of the MFP 100 can be controlled by turning on/off the power switch 14.

With the above configuration, the MFP 100 having a copy function, a printer function, a scanner function and the like is configured. The present disclosure is applicable not only to the MFP but also to a printing unit (a printer) that is a single function printer (a SFP), an image reading unit (a scanner), a facsimile machine, and various electronic devices.

The printing method of the printer unit 13 is not limited to the electrophotographic method. Any other printing methods capable of forming images on a sheet-like recording medium (for example, recording paper), for example, an ink jet method and a thermal transfer method, may be used.

The MFP 100 is an information processing apparatus, such as an image forming apparatus, operable while switching among a plurality of power states (the details will be described later). For example, the MFP 100 can reduce power consumption by shifting to a suspend mode of a memory resume method with a power saving button or the like.

Figure 2:
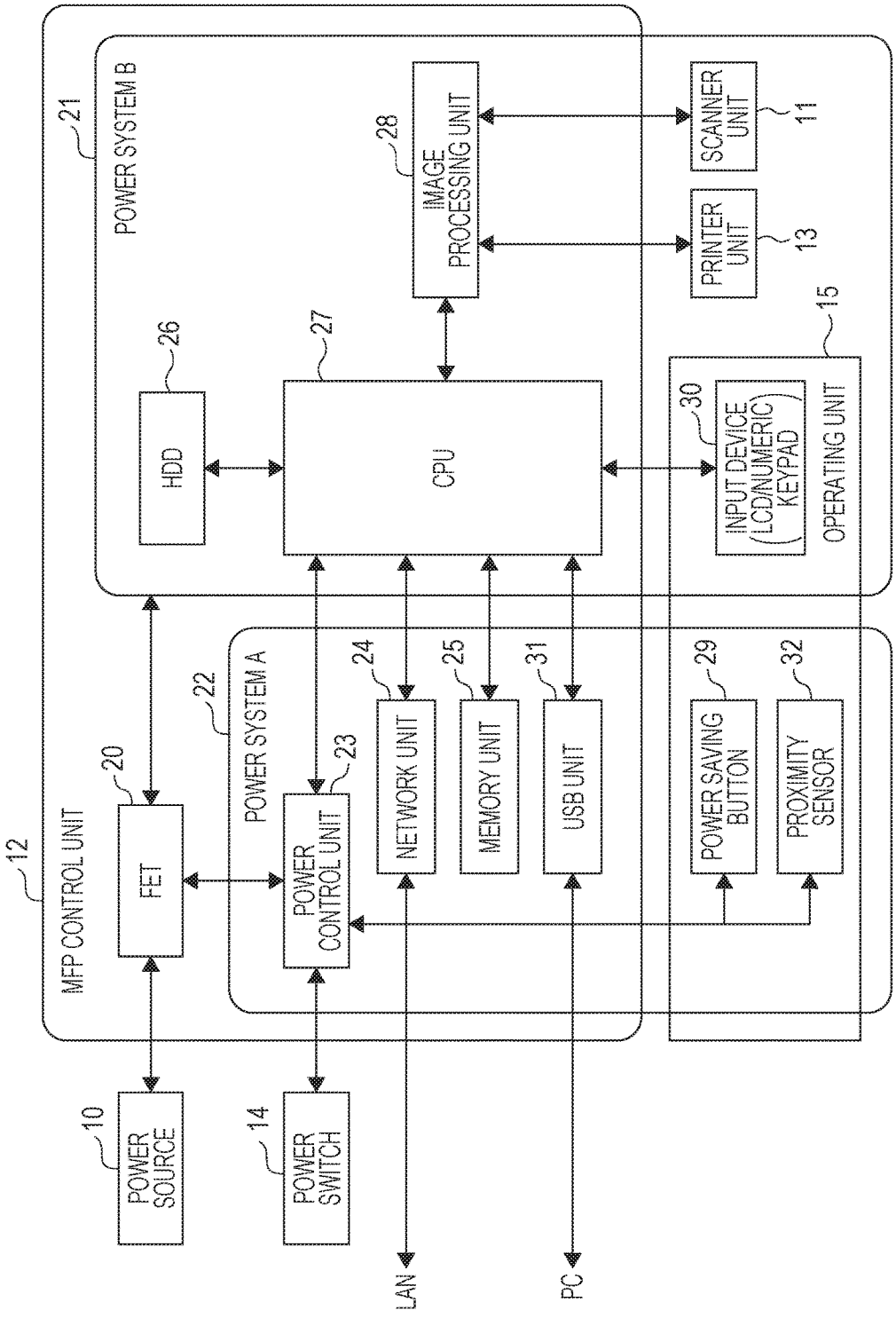
FIG. 2 is a diagram illustrating, in outline, the configuration of an MFP control unit.

FIG. 2 is a diagram illustrating, in outline, the configuration of the MFP control unit 12. In the following description, descriptions of the already-mentioned reference signs will be omitted.

A power control unit 23 has a function of giving an interrupt notification to a central processing unit (CPU) 27 upon receiving operation of the power switch 14, depression of a power saving button 29 disposed on the operating unit 15, or proximity detection by a proximity sensor 32. The power control unit 23 also performs control such that power supply to each unit is interrupted (stopped) at the time of shifting to the suspend mode and power supply to each unit is resumed at the time of restoration from the suspend mode.

A field-effect transistor (FET) 20 is a switch for turning on and off power supply to a power system B21. The CPU 27 is a control unit for controlling the entire MFP 100. A memory unit 25 is a volatile memory such as a double-data-rate synchronous dynamic random-access memory (DDR-SDRAM). The operating unit 15 includes an input device 30, such as a liquid-crystal display (LCD) panel or a numerical keypad, and is capable of detecting a user input operation. An image forming unit 28 is a control unit that performs processing such as compressing data from the scanner unit 11 and outputting image data processed by the CPU 27 to the printer unit 13.

The HDD 26 is an external storage device, which may be another non-volatile storage device such as a solid-state drive (SSD). A network unit 24 is one of interfaces outside the MFP 100 and is capable of receiving a print instruction from an external personal computer (PC) (not shown) or the like over a network. A universal serial bus (USB) unit 31 is also one of interfaces outside the MFP 100 and is capable of receiving a print instruction from an external personal computer (PC) (not shown) or the like over a network.

Next, the power system of the MFP control unit 12 will be described.

The present embodiment employs a suspend method in which data is stored in a memory so that power consumption is lower than that in a normal state and startup is fast. However, the present disclosure may not employ the suspend method but may employ another method, such as a hibernation method. When an off operation of the power switch 14 is detected, the MFP 100 stores a first mode when the off operation is detected. The MFP 100 shifts the power state of the MFP 100 to a second mode which can be restored to the first mode when an on operation of the power switch 14 is detected next. In the present embodiment, the first mode is a normal mode, and the second mode is a suspend mode. The amount of power consumed by the MFP 100 in the suspend mode is lower than the power consumed by the MFP 100 in the normal mode.

The power system B21 is a power system that supplies power to the CPU 27, the image forming unit 28, and the HDD 26. Interruption/supply of power to the power system B21 is controlled by controlling the FET 20 according to a control signal output from the power control unit 23.

Here, the state change of each device from the start of a suspending process to completion of a resuming process and events will be described.

Figure 6:
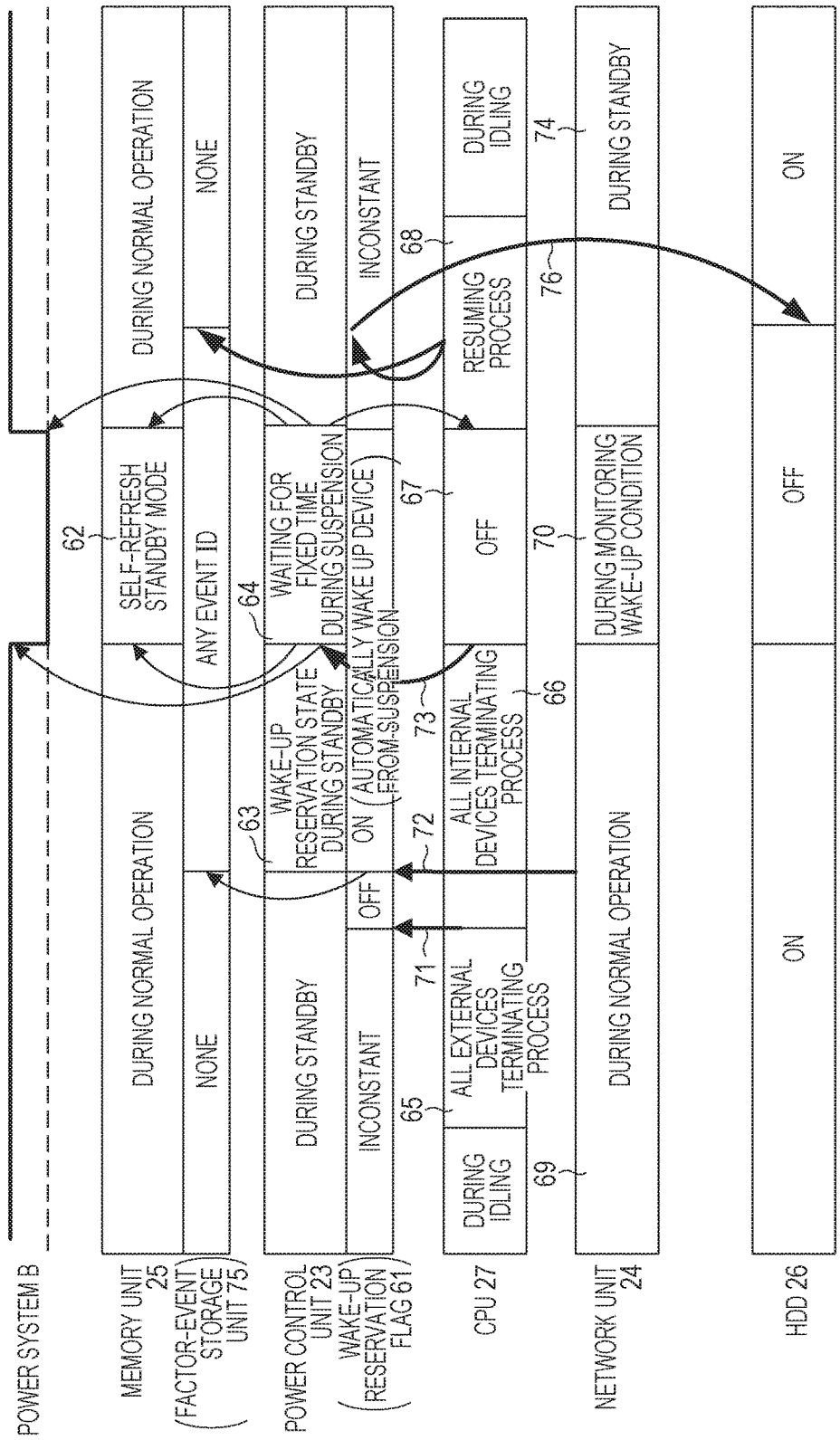
FIG. 6 is a diagram illustrating the state of each device for each elapsed time in the first embodiment.

FIG. 6 is a diagram illustrating the state of each device for each elapsed time in the first embodiment, illustrating the state change of each device from the start of a suspending process to completion of a resuming process and events.

Figure 3:
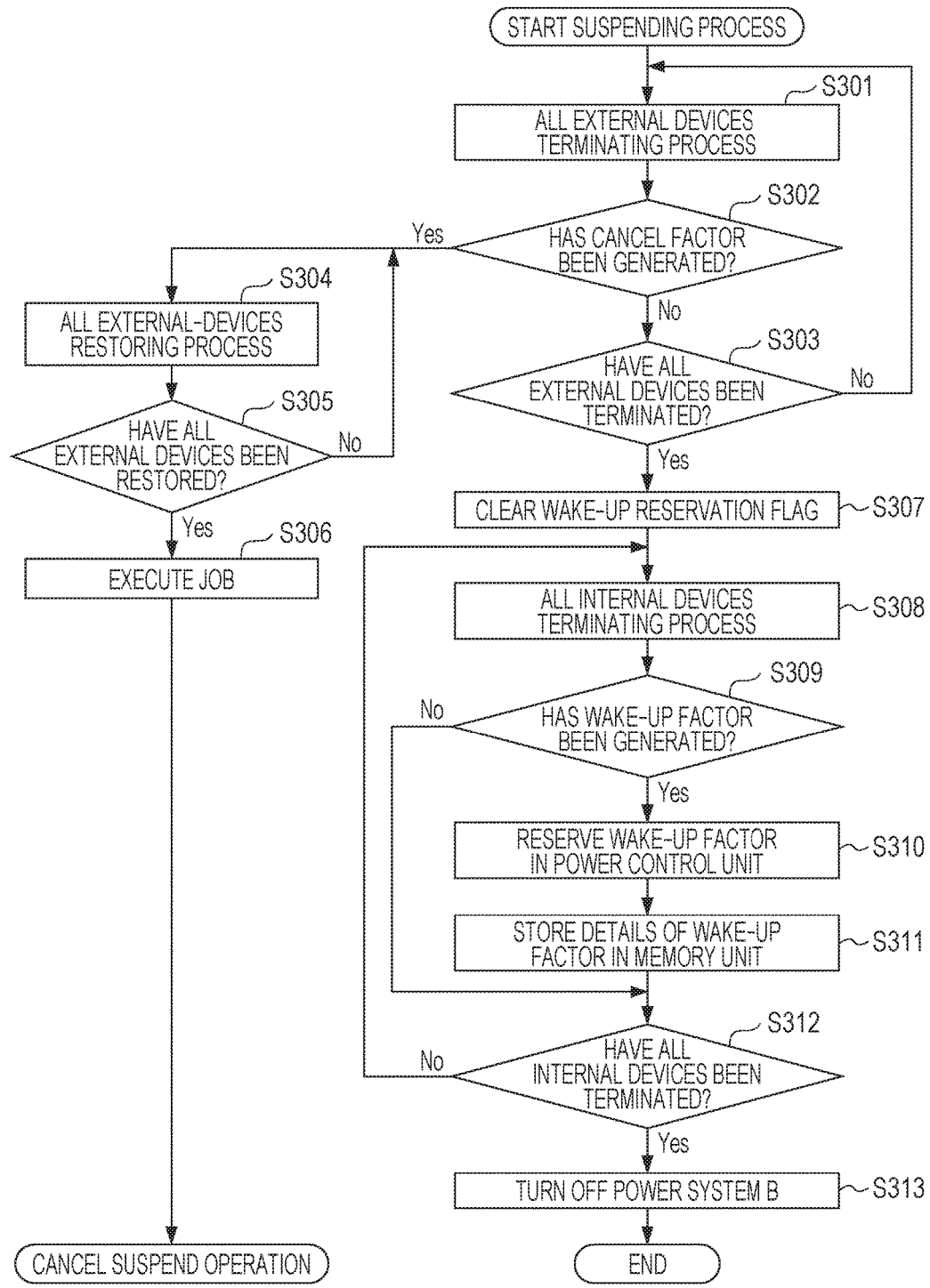
FIG. 3 is a flowchart illustrating a suspending process according to a first embodiment of the present disclosure.
Figure 4A:
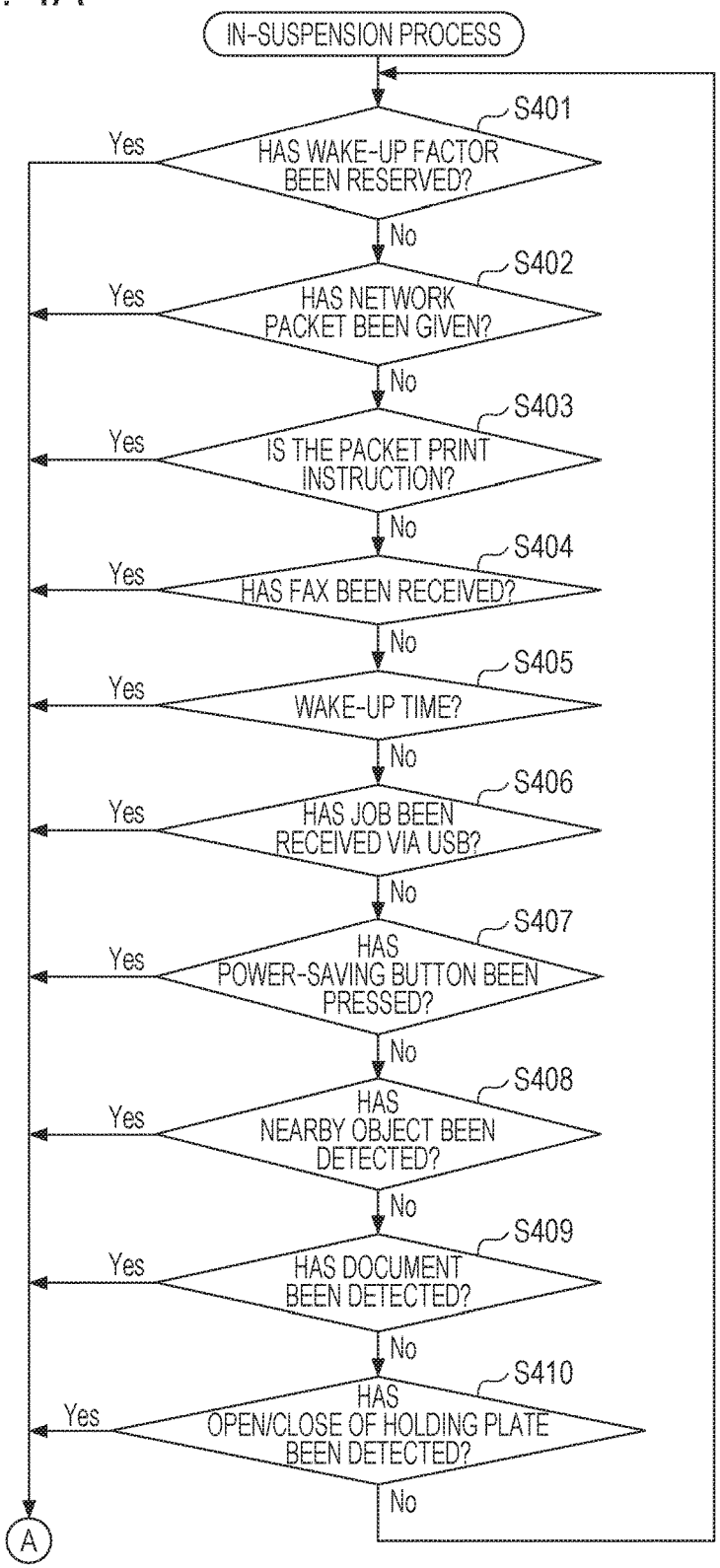
FIGS. 4A and 4B illustrate an in-suspension process performed by a power control unit of the first embodiment.
Figure 4B:
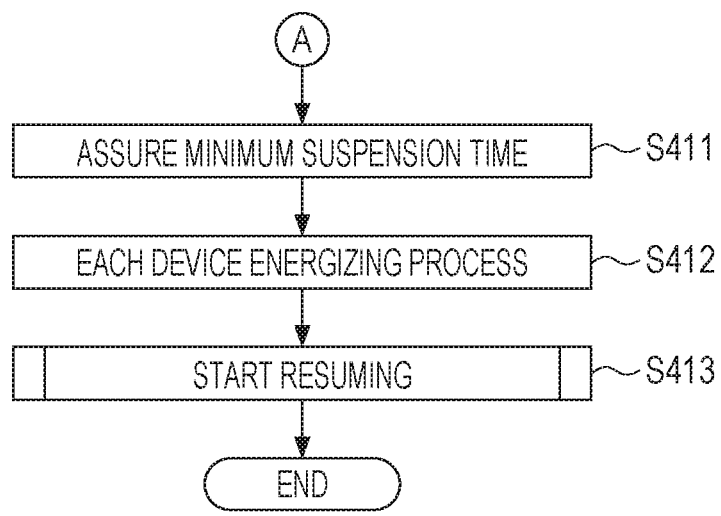
Figure 7:
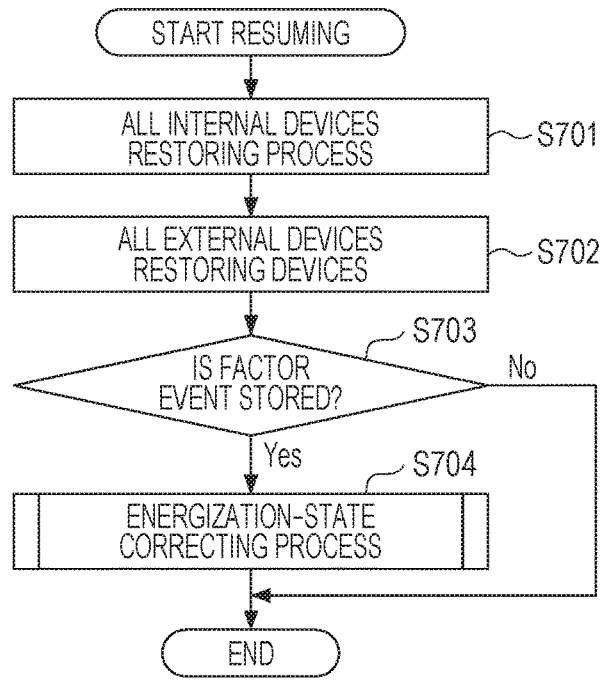
FIG. 7 is a flowchart illustrating a resuming process of the first embodiment.

The state of each device changes from the start of a suspending process to completion of a resuming process depending on a suspending process illustrated in FIG. 3, an in-suspension process illustrated in FIGS. 4A and 4B, and a resuming process illustrated in FIG. 7. In the present embodiment, energization state control of the HDD 26 will be described. However, this is applicable to other devices, such as the printer unit 13, the scanner unit 11, and the operating unit 15.

In the first embodiment, only binary values indicating whether wake-up reservation is made are stored in the power control unit 23. In a second embodiment (to be described later), event ID 901 illustrated in FIG. 9 (to be described later) can be set in the power control unit 23, and a configuration of in which the power control unit 23 performs energization control at the time of resuming on the basis of the value of the set event ID 901. The event ID 901 is information specifying a wake-up factor event. The details will be described later.

When the CPU 27 detects a suspend factor such as no input from the input device 30 for a certain period of time or depression of the power saving button 29, the CPU 27 executes the suspending process illustrated in FIG. 3. This will be described in detail hereinbelow.

FIG. 3 is a flowchart illustrating the suspending process of the first embodiment. The steps in the flowchart are implemented by, for example, the CPU 27 reading a computer-readable program stored in the HDD 26 to the memory unit 25 and executing it.

When the suspending process is started, then at S301 the CPU 27 performs a process for terminating all external devices such as the printer unit 13 and the scanner unit 11. The CPU 27 repeats the process from S301 to S303 until the process of terminating all external devices is completed while determining whether a suspend cancel request has been issued at S302, (an all external devices terminating process illustrated in state 65 of FIG. 6) because some devices take much time for the termination processing. If the CPU 27 determines that a suspend cancel factor (for example, job reception by the network unit 24) is generated before the all external devices terminating process is completed (before reaching Yes at S303) (S302: Yes), the CPU 27 determines to cancel the shift to the suspend mode and advances the processing to S304.

Since several devices have already been terminated, at S304 the CPU 27 performs a process for restoring all external devices, and at S305 checks whether all the external devices have been restored, and advances the processing to S306.

At S306, the CPU 27 executes a process corresponding to the generated cancel factor (for example, the job) and cancels the suspend operation. When the suspend operation is cancelled, the CPU 27 executes the suspending process again after completion of the job, which is the cancel factor.

If the CPU 27 determines that the all external devices terminating process has been completed (S303: Yes) without a cancel factor (S302: No), then the CPU 27 performs control so as not to cancel the suspend operation and advances the processing to S307.

At S307, the CPU 27 clears a wake-up reservation flag 61 (event 71 in FIG. 6) to initialize the state for holding generation of a wake-up factor until entering the suspend mode.

Next at S308, the CPU 27 performs a process for terminating all internal devices. The internal devices include the network unit 24, the USB unit 31, the HDD 26, and the image forming unit 28. In the internal devices terminating process, the CPU 27 stores the present state of each internal device in the memory unit 25 and thereafter changes the operation mode of each internal device so that each internal device operates independently from the control of the CPU 27 even during suspension. The CPU 27 repeats the process from S308 to S312 (an all internal devices terminating process in state 66 of FIG. 6) until the process for terminating all internal devices is completed while determining at S309 whether a wake-up factor that causes cancellation is generated because some of the termination processes take much time. Unlike the external devices, the internal devices cannot be accessed after the termination processing, so that it is necessary to strictly determine the order of termination. For that reason, the all internal devices terminating process may not be interrupted after the terminating process is started for stable operation unlike the external devices. For this reason, if it is determined that a wake-up factor (for example, job reception by the network unit 24) is generated before completion of the all internal devices terminating process (S312: Yes) (S309: Yes) (event 72 in FIG. 6), the CPU 27 advances the processing to S310.

At S310, the CPU 27 sets a wake-up reservation flag 61 by operating a register provided at the power control unit 23 (S310, state 63, a wake-up reservation state in FIG. 6). In other words, when an event serving as a wake-up factor is generated in a state in which interruption of the suspending process is impossible, the CPU 27 reserves a resuming process (restoration). The wake-up reservation flag 61 is stored in the power control unit 23 and is referred to at S401 in FIG. 4A (to be described later).

At S311, the CPU 27 stores an event ID 901 corresponding to the event serving as the generated wake-up factor in a factor-event storage unit 75 which is one region of the memory unit 25 and advances the processing to S312 to continue the suspending process. The event ID 901 is listed in FIG. 9 in which requests and corresponding event IDs 901 are associated with each other. The event ID 901 stored in the factor-event storage unit 75 is referred to at S703 in FIG. 7 (to be described later).

If at S312 the CPU 27 determines that the all internal devices terminating process has been completed (S312: Yes), the CPU 27 sends a suspend shifting instruction to the power control unit 23 (event 73 in FIG. 6) to turn off the FET 20 to thereby turn off the power to the power system B21, and terminate the suspending process. By turning off the power to the power system B21, the suspend mode is started. Specifically, the power control unit 23 brings the memory unit 25 into a self-refresh standby mode (state 62 in FIG. 6) and turns off the power system B21, so that the CPU 27 is turned off (state 67 in FIG. 6). Thereafter, the power control unit 23 shifts to the suspend mode (state 64 in FIG. 6).

The suspend mode in state 64 of FIG. 6 is a state equivalent to the suspend mode of the entire MFP control unit 12. During the suspend mode, only a power system A22 operates. At that time, the network unit 24 determines whether it has received a packet to be restored from the suspend mode (during monitoring wake-up condition in state 70 of FIG. 6). The power control unit 23 continues the suspend mode while monitoring the presence or absence of a request to start resuming. The power control unit 23 may either a unit including a built-in CPU or a dedicated hardware logic. The operation of the power control unit 23 during the suspend mode (during suspension in state 64 of FIG. 6) is illustrated in FIGS. 4A and 4B. The operation will be described in detail hereinbelow.

FIGS. 4A and 4B illustrate an in-suspension process performed by the power control unit 23 of the first embodiment (a process performed by the power control unit 23 in the suspend mode in which the power system B21 is off). In the case where the power control unit 23 incorporates a CPU, the processing of the flowchart is achieved by the CPU of the power control unit 23 executing a program stored in the power control unit 23.

In the suspend mode (during suspension in state 64 of FIG. 6), the power control unit 23 performs the determination processing from S401 to S410. If the power control unit 23 determines to be No in the determination processing of all of S401 to S410, the power control unit 23 keeps the suspend mode and repeats the determination processing from S401 to S410. If the power control unit 23 determines to be yes in the determination processing of any of S401 to S410, the power control unit 23 advances the processing to S411 to start resuming. Processing after S411 will be described later. The determination processing from S401 to S410 will be described hereinbelow.

At S401, the power control unit 23 determines whether a wake-up factor has been reserved. This is determined from whether the wake-up reservation flag 61 set in the power control unit 23 at S310 of FIG. 3 is present. The wake-up factor reservation flag 61 serves as a trigger to immediately start resuming after the device enters the suspend mode. If the power control unit 23 determines that wake-up factor reservation is present, the power control unit 23 immediately starts resuming.

At S402 and S403, the power control unit 23 determines whether a resuming start instruction has been sent from the network unit 24 (determination of whether the wake-up condition in state 70 is true). The network unit 24 notifies the power control unit 23 whether the received network packet is a print instruction or another wake-up packet on the basis of the analysis of the network packet, and the power control unit 23 performs energization control depending on the notified information. If the network packet is a print instruction, the power control unit 23 energizes the printer unit 13 necessary for printing, and if the network packet is other than the print instruction, the power control unit 23 does not energize the printer unit 13, thereby preventing wasteful power consumption.

At S404, the power control unit 23 determines whether an incoming fax from a facsimile machine (not shown) is present.

At S405, the power control unit 23 determines whether an alarm from a real-time clock (RTC) is present.

At S406, the power control unit 23 determines whether a job instruction is given via the USB unit 31.

At S407, the power control unit 23 determines whether the power saving button 29 is pressed.

At S408, the power control unit 23 determines whether a nearby object is detected by the proximity sensor 32.

At S409, the power control unit 23 determines whether a document from the scanner unit 11 or the printer unit 13 is detected. The detection of a document includes that the scanner unit 11 detects that a document has been set on a document feeder (not shown) or that the printer unit 13 detects that a sheet has been set on a manual feed tray of the printer unit 13.

At S410, the power control unit 23 determines whether a document holding plate of the scanner unit 11 is opened or closed.

If the power control unit 23 determines to be Yes in the determination processing of any of S401 to S410, the power control unit 23 advances the processing to S411.

At S411, the power control unit 23 assures a minimum suspension time. This process is performed to assure a minimum time of suspension to avoid reset trouble and is a process of waiting until the minimum suspension time elapses from shifting to the suspend mode. When the minimum suspension time elapses, the power control unit 23 advances the processing to S412.

At S412, the power control unit 23 sets the energization state of each device on the basis of the determination results at S401 to S410, the table in FIG. 9 (described later), and the wake-up factor (each device energizing process).

Next, at S413, the power control unit 23 instructs the CPU 27 to start resuming.

In other words, at S412 and S413, the power control unit 23 turns on the FET 20 to cause the power system B21 to start energization to thereby cancel the reset signal to the CPU 27. Thereafter, the CPU 27 shifts to the state before suspension by setting the interrupt state of each device stored in the memory unit 25 at the suspending process to each device (resuming process in state 68 of FIG. 6). At that time, the CPU 27 retrieves control of the network unit 24 and the USB unit 31 (state 74 of FIG. 6 in which the network unit 24 is in the standby mode, that is, the normal state), and the CPU 27 regains control over the MFP control unit 12. Furthermore, during the resuming process, the CPU 27 corrects the energization state of each device into a power state corresponding to the event ID 901 of the factor event stored in the factor-event storage unit 75. The details of the resuming process are described in FIG. 7 (to be described later).

As described above, in the configuration of the present embodiment, an event (factor event) that causes interruption of suspension is generated in a state in which suspend transition in the middle of entering suspension cannot be canceled, the flag state is held in the power control unit 23 to automatically perform a resuming operation. Furthermore, by storing the generated factor event in the factor-event storage unit 75, the CPU 27 refers to the factor-event storage unit 75 after completion of resuming of the internal devices and checks whether the energization state of each device assumed from the event ID 901 stored in the factor-event storage unit 75 and FIG. 9 and actual energization state match. In the example of FIG. 6, the energization state of the HDD 26 is off state different from that assumed from the event ID 901. For that reason, the CPU 27 operates the power control unit 23 to turn on the HDD 26 (process 76 in FIG. 6, S803 in FIG. 8, to be described later). The details of the series of resuming process will be described with reference to FIGS. 7 and 8 (to be described later).

The periphery of the power control unit 23 and the CPU 27 will be described in more detail.

FIG. 5 illustrates the periphery of the power control unit 23 and the CPU 27 in more detail.

For example, a print job sent from an external device (a personal computer or the like, not shown) to the MFP 100 is converted from analog to digital by a physical layer (PHY) 53 and is generated as a data packet by a local area network (LAN) controller (LANC) 54. The data is stored in a buffer (BUF) 56, for example, a descriptor table, provided in the memory unit 25 via an internal buffer 55. For example, in the case where the received data is an Ethernet® frame, a protocol stack 57 (software) analyzes the data, and the data is notified to an application 59 via, for example, a socket I/F 58 (software) of transmission control protocol/Internet protocol (TCP/IP). The application 59 analyzes the content of the data to determine whether the packet is a wake-up request for a job or the like.

The network is an interface that continues to expand, so that the data is notified to the application 59 via buffers on a plurality of hardware and a buffer formed of software (actually in the memory unit 25). Transmission of a print job based on the TCP/IP protocol will be described by way of example.

When a small job that fits within the window size of the TCP/IP protocol stack is received, the TCP/IP transfer is completed in a state in which the job is present in the protocol stack 57 (actually in the memory unit 25). In this case, a host PC (not shown) that sends the job regards it as completion of transmission, and the job enters a "printing completed" state.

However, the state in which the job is present in the protocol stack 57 is a state in which the application 59 makes a reception request to the socket I/F 58, as described above, and the application 59 has not yet detected the job reception itself. For example, assume that the packet as described above is received after the suspending process is started. In the state in which the job is present in the protocol stack 57, the determination at S302 in FIG. 3 is No.

If the all external devices terminating process is completed in this state (Yes at S303 in FIG. 3), the processing shifts to an all internal devices terminating process (S308 in FIG. 3) into a state in which it cannot restoration halfway. That is, the processing shifts to the suspend mode, with the job left on the memory.

However, when the host PC transmits any network packet in this state, it is determined that the power control unit 23 is performing the in-suspending process and the wake-up factor reservation is present (Yes at S402 or S403 in FIG. 4A), so that the processing shifts to the resuming operation. This allows the network packet that is suspended while being held in the memory unit 25 is processed into a print job for printing. However, whether a packet is transmitted from the PC on which the job is completed is not assured because it depends on the specification of the sender at the end of the external I/F.

In the case of a job that is completed in one packet, the job can be suspended in a state in which the job is present in the buffer 55. In this case, the job cannot be detected by the software of the CPU 27 using any method.

The on operation on the wake-up reservation flag 61, described above, becomes valid from the timing when the suspension cannot be canceled during the suspending process. Therefore, the on operation on the wake-up reservation flag 61 is valid only during the period from S308 in FIG. 3 until the suspending processing is completed (the interval of state 66 in FIG. 6).

The on operation on the wake-up reservation flag 61 in the above case will be described hereinbelow.

(A) On-Operation on Wake-Up Reservation Flag 61 with Network Unit 24

To prepare for a possibility that a packet is held in the buffer 55, the network unit 24 monitors a packet serving as a wake-up factor, and if the network unit 24 determines that a wake-up factor is generated, the network unit 24 asserts an interrupt line 60 to cause the power control unit 23 to set the wake-up reservation flag 61. In this case, event 72 is notified to the power control unit 23 over the interrupt line 60 without involving the CPU 27. This causes the power control unit 23 to turn on the wake-up reservation flag 61 into the wake-up reservation state in the standby mode (63 in FIG. 6). If interruption is asserted for all packets, interruption of a broadcast packet, an address resolution protocol (ARP) packet, and the like are also asserted. For that reason, the network unit 24 determines a packet that needs a response, such as a job or a simple network management protocol (SNMP), not the broadcast packet, the ARP packet, and the like, to achieve more accurate wake-up reservation. In this case, the network unit 24 notifies the CPU 27 whether the packet serving as the wake-up factor is a print instruction or another wake-up packet, and the CPU 27 stores the event ID 901 in the factor-event storage unit 75 on the basis of the notified information.

(B) On-Operation on Wake-Up Reservation Flag 61 with Protocol Stack 57

The protocol stack 57 is a software module that implements a series of communication protocols and is generally present in a library in the kernel. The protocol stack 57 is a stack of network protocols, such as IP and TCP, each including an independent temporary buffer. Information that can be determined depends on the layer of the stack. The most common example is the TCP port number of a TCP protocol stack. This is a technique for enabling multiplexing of communication with loosely coupled engagement of using any number for both a sender and a receiver, that is, the provision that RAW port number for printing is 9100, and LPR port number is 515, etc. There is a process of determining a port number in the protocol stack to assign the data to a desired port, but at this point it can be expected that the data may be a print job or a wake-up packet other than the print job, etc. Upon reception from the outside, the kernel of the CPU 27 performs reception processing. In this protocol stack, the CPU 27 issues event 72, notifies it to the power control unit 23, and stores an event ID 901 according to the print instruction or network communication in the factor-event storage unit 75. The power control unit 23 turns on the wake-up reservation flag 61 to enter a wake-up reservation state in the standby mode. Thus, the protocol stack 57 issues a command or the like of the CPU 27 to set the wake-up reservation flag 61 according to the port number, so that the protocol stack 57 allows setting a wake-up reservation target by receiving necessary data.

(C) On-Operation on Wake-Up Reservation Flag 61 with Socket I/F 58

The socket I/F 58 is a mechanism for multiplexing data transmission and reception of the kernel. The socket I/F 58 may have a buffer in this layer using a loosely coupled data multiplexing method as of the port described above. The socket I/F 58 may also pass a pointer by changing virtual memory mapping. The application 59 receives data of, for example, any port of TCP, via the socket of the kernel. Since the use application is almost fixed for each socket, the socket I/F 58 issues event 72 at the time when it receives data through a socket for printing, notifies the event 72 to the power control unit 23, and stores an event ID 901 according to the print instruction or network communication in the factor-event storage unit 75. The power control unit 23 turns on the wake-up reservation flag 61 into a wake-up reservation state in the standby mode. In other words, the socket I/F 58 issues a command of the CPU 27 to set the wake-up reservation flag 61 at the time when data is acquired through the socket, so that the socket I/F 58 allows setting a wake-up reservation target by receiving necessary data.

When it is determined that received data is a wake-up factor, the application 59 issues a command of the CPU 27 to set the wake-up reservation flag 61 at that point in time, so that the application 59 allows setting a wake-up reservation target by receiving necessary data. Furthermore, the application 59 stores an event ID 901 according to print instruction or network communication in the factor-event storage unit 75.

The MFP 100 of the present embodiment may employ either all or any of (A), (B), and (C). The performance of the layers of (A), (B), and (C) differ in time taken to pass data to the application and in temporarily holdable buffer size. The packet data analysis method differs among the layers, which concerns the reliability of determination. However, the determination is common in networks, and detailed description will be omitted.

For example, in a system in which a CPU is installed in the network unit 24 for performing a network response during suspension, the method (A) maximizes the power merit.

In sleep control of wait-for-interrupt type that brings the CPU into an interrupt waiting state (doze mode) or the like, the method (B) provides a system with the highest reliability. In this manner, any of the above methods may be selected according to reliability and power required. There are cases where job determination cannot be performed until the application 59 receives data to some extent, such as page-description language (PDL) data. In such a case, by issuing an instruction of the CPU 27 to set the wake-up reservation flag 61 at the time when the data is determined to be a job, the data can be set as a wake-up reservation target.

This is a method for avoiding a trouble that a device enters a suspend mode in the process of processing a print instruction or an inquiry job from the outside that is generated immediately before the suspension and is not woken up, as described above. In the present embodiment, when the device shifts from the "wake-up reservation" state 63 to "waiting for fixed time during suspension" state 64 in FIG. 6, it is determined to be wake-up factor reservation at S401 in FIG. 4A, and resuming is automatically started.

The USB unit 31 is also a representative block device. The CPU 27 and the external I/F have substantially the same buffer configuration as that of the network unit 24 described above, and detailed description will be omitted.

The resuming process will be described hereinbelow.

FIG. 7 is a flowchart illustrating the resuming process of the first embodiment. The CPU 27 restores the state of each external device and each internal device for which termination processing according the resuming process illustrated in the flowchart. The steps illustrated in the flowcharts of FIG. 7 and FIG. 8 (to be described later) are implemented by, for example, the CPU 27 reading a computer-readable program stored in the HDD 26 into the memory unit 25 and executing the program.

First at S701, the CPU 27 performs an all internal devices restoring process. In this process, the CPU 27 writes back the register information of each device stored in the memory unit 25 at S308 in FIG. 3 to restore the state of each internal device to the state before suspension. For devices that need reloading of firmware, the CPU 27 installs the firmware and then initializes the devices.

Next at S702, the CPU 27 performs an all external devices restoring process. In this process, the CPU 27 performs the same process as the process at S304 in FIG. 3.

Next, the CPU 27 determines whether the event ID 901 of the factor event is stored in the factor-event storage unit 75. If the CPU 27 determines that the event ID 901 is stored (S703: Yes), the CPU 27 advances the processing to S704.

At S704, the CPU 27 determines that wake-up reservation is made at S310 of FIG. 3 and performs a device-energization-state correcting process. This is because there is a possibility that the energization setting based on the event ID 901 has not necessarily been performed by the power control unit 23 because of resuming caused by the wake-up reservation flag 61. The details of the energization-state correcting process at S704 will be described with reference to FIG. 8 (to be described later).

If at S703 the CPU 27 determines that the event ID 901 is not stored (S703: No), the CPU 27 determines that there is no discrepancy in the energization state and terminates the resuming process without correcting the energization state.

Figure 8:
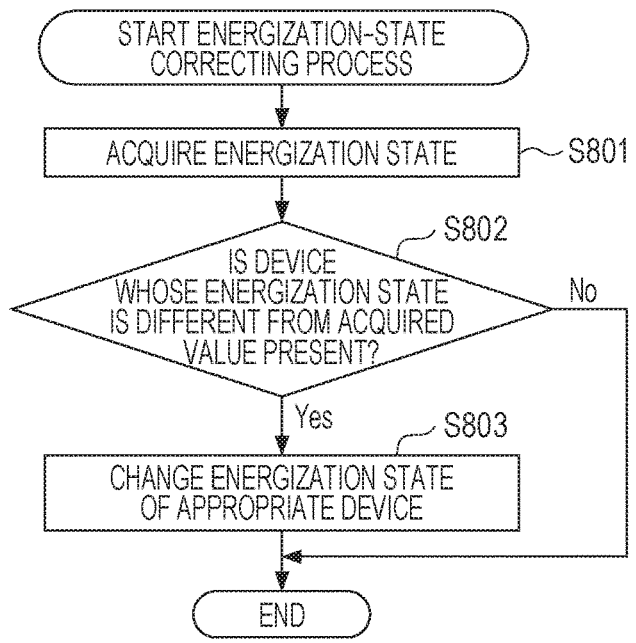
FIG. 8 is a flowchart illustrating an energization-state correcting process in the resuming process of the first embodiment.

FIG. 8 is a flowchart illustrating the energization-state correcting process in the resuming process of the first embodiment. In this process, if there is a device whose energization state differs from the state listed in the correspondence table of wake-up factors and the energization states of the devices in FIG. 9, the energization state is corrected to the energization state in the table. Thus, an energization state corresponding to a wake-up event that triggered the wake-up reservation flag 61 can be set.

First at S801, the CPU 27 acquires the energization state of each device via the power control unit 23.

Next at S802, the CPU 27 compares the energization state of each device of the event ID 901 acquired at S703 of FIG. 7 and the energization state of each device acquired at S801 with reference to the energization state correspondence table illustrated in FIG. 9. As a result of the comparison, if it is determined that there is a device whose energization state differs from the energization state corresponding to the event ID 901 (S802: Yes), the CPU 27 advances the processing to S803.

At S803, the CPU 27 changes the energization state of the device whose energization state differs from the energization state corresponding to the event ID 901 to the energization state corresponding to the event ID 901 via the power control unit 23.

In contrast, if it is determined that there is no device whose energization state differs from the energization state corresponding to the event ID 901 (S802: No), the CPU 27 terminates the process of the flowchart without correcting the energization state.

In other words, when a predetermined event (a wake-up factor event) is generated during the suspending process, the CPU 27 reserves wake-up to the power control unit 23, stores the factor event ID in the factor-event storage unit 75, and continues the suspending process. After restoration by the resuming process, the CPU 27 controls the power supply state of the MFP 100 according the factor event ID 901 stored in the factor-event storage unit 75.

For example, when a print instruction is given during the suspending process, the above process allows the resuming process to be immediately performed based on the wake-up reservation flag 61, and the HDD 26 and the printer unit 13 to be corrected to on-state at the time of resuming. The above processes prevent missing of a packet necessary for printing and energization of necessary devices to be performed at the time of resuming, which reduces an initialization waiting time after the energization, reducing degradation of printing performance.

FIG. 9 is a table listing the energization state of each device of each wake-up factor after resuming. Here, the devices refer to the scanner unit 11, the printer unit 13, the operating unit 15, and the HDD 26.

When the power control unit 23 detects any wake-up factor after shifting to the suspend mode, the power control unit 23 changes the energization state of each device at the time of resuming according to the contents illustrated in FIG. 9. Each wake-up factor is assigned a corresponding event ID 901, which is referred to in the process of FIG. 8 described above. The contents illustrated in FIG. 9 are incorporated in, for example, the software developed in the memory unit 25, and is used by the CPU 27 referring to the contents or in the circuit of the power control unit 23 for reference.

Since the power control unit 23 determines whether to energize each device at the resuming, as described above, power to each device can be turned on before the initialization of the CPU 27, but power is consumed by each device because of the energization. For example, when a print instruction, such as a print job, is issued (when the event ID 901 is "1"), the power control unit 23 energizes the printer unit 13, which is necessary for printing, at the resuming, so that a warming-up process can be started before software operation starts. For network communication, which does not incorporate printing, (when the event ID 901 is "2"), wasteful power consumption can be prevented by not energizing the printer unit 13 at the time of resuming.

Second Embodiment

In the first embodiment, a configuration is described in which, when a restoration request is given in a power-saving state, restoration is reserved to the power control unit 23, and the details of the restoration request is stored in the memory unit 25, and energization setting of each device is performed after restoration with reference to the details. In a second embodiment, unlike the first embodiment, a system capable of a plurality of wake-up reservation settings to the power control unit 23 will be described. Hereinafter, the system will be specifically described with reference to FIG. 10.

Figure 10:
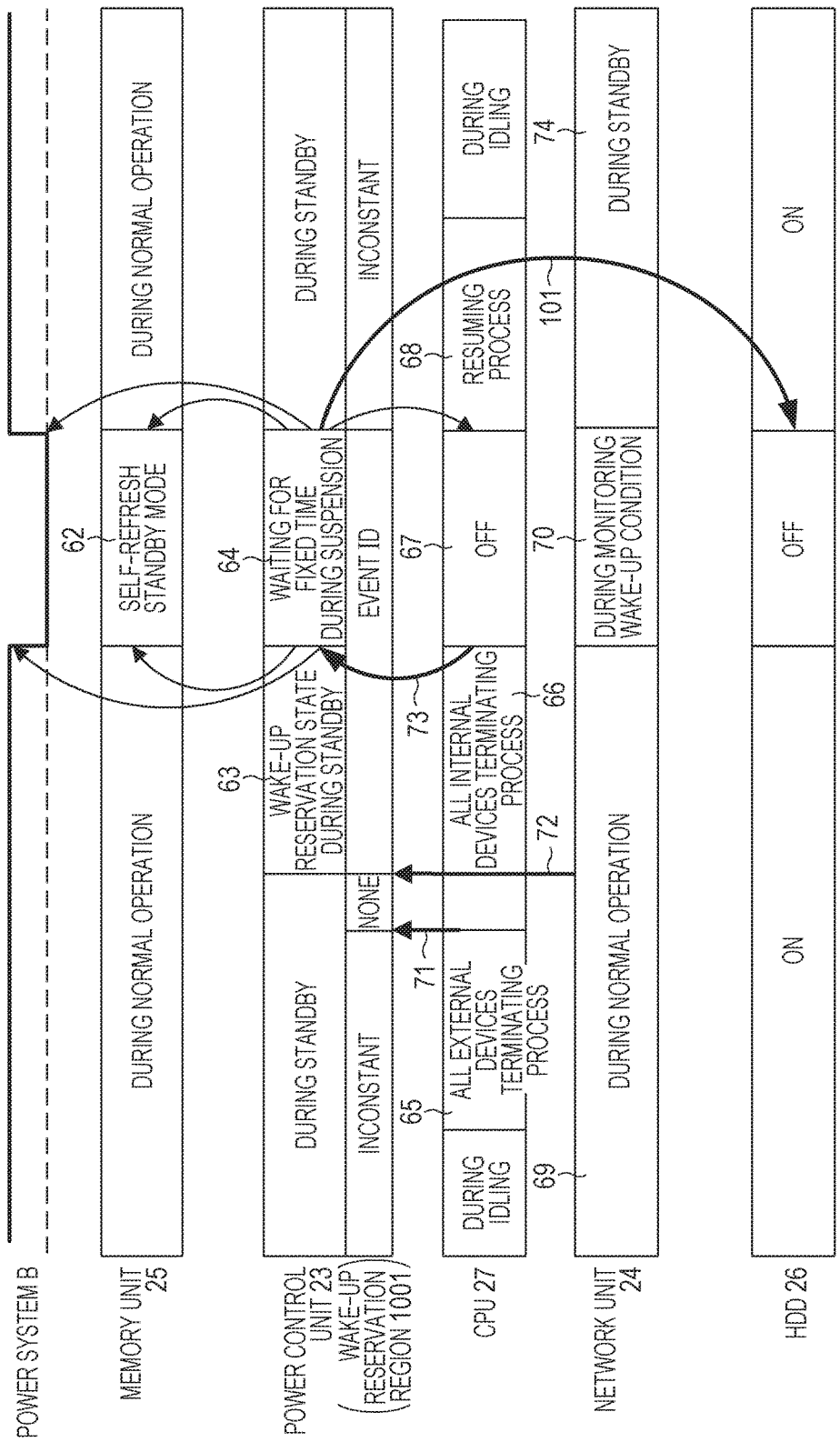
FIG. 10 is a diagram illustrating the state of each device for each elapsed time in a second embodiment.

FIG. 10 is a diagram illustrating the state of each device for each elapsed time in the second embodiment.

As illustrated in FIG. 10, the power control unit 23 of the second embodiment includes a wake-up reservation region 1001. The CPU 27 can write event ID 901 to the wake-up reservation region 1001. At energization control of each device at the time of resuming, the power control unit 23 performs energization control of each device on the basis of the event ID 901 described in the wake-up reservation region 1001 and the energization setting table in FIG. 9. This allows the energization of each device to be set at the energization process before the CPU 27 becomes operable.

Although FIG. 10 is substantially the same as FIG. 6 of the first embodiment, it differs in that the CPU 27 sets an event ID 901 corresponding to an event that triggers wake-up reservation to the wake-up reservation region 1001 of the power control unit 23 at the time when the trigger event is generated (for example, a print instruction 72).

Another difference is that the power control unit 23 performs energization control of each device on the basis of the event ID 901 stored in the wake-up reservation region 1001 at the time when resuming is started (101). The details will be described with reference to the flowcharts of FIGS. 11 to 13.

Figure 11:
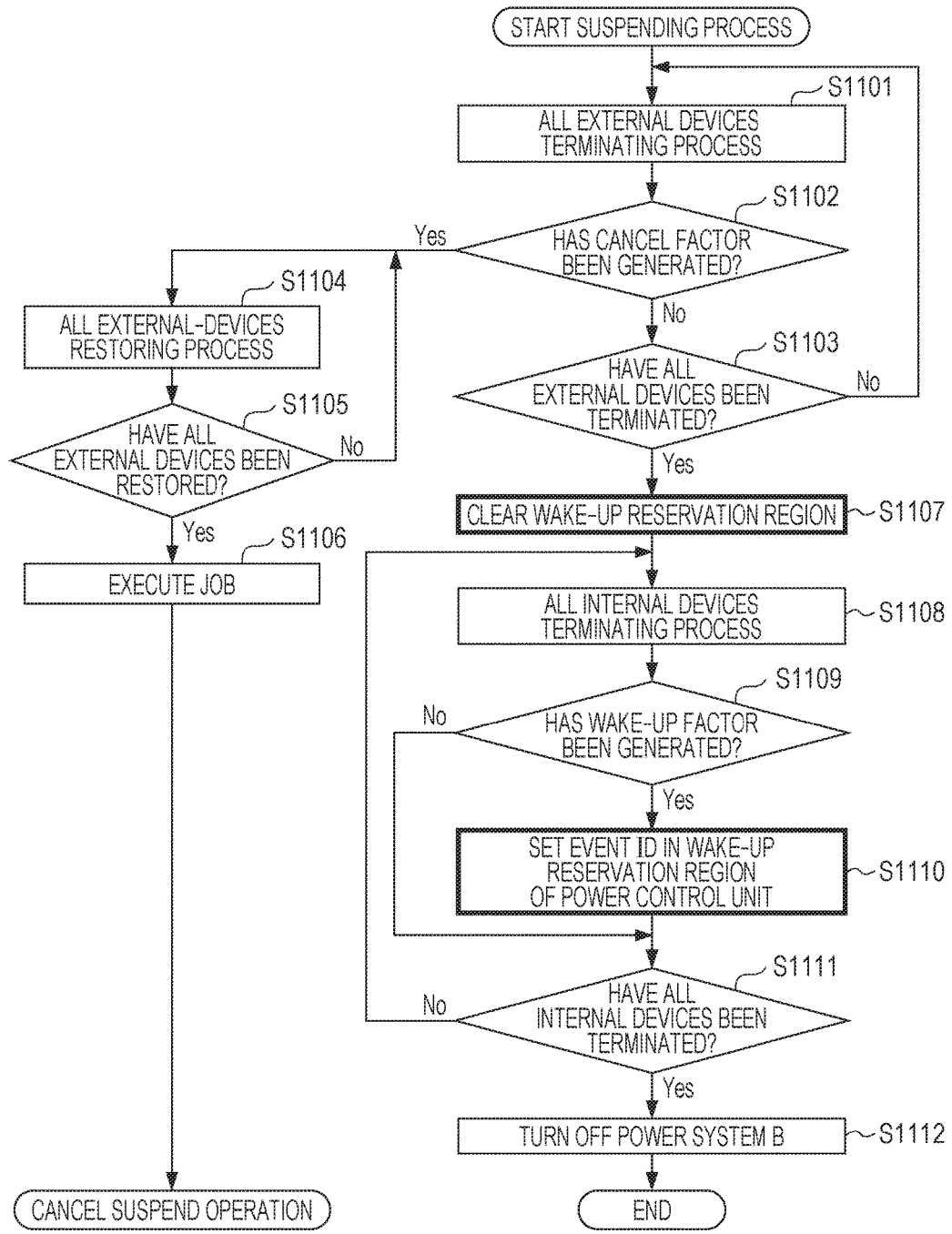
FIG. 11 is a flowchart illustrating a suspend shifting process of the second embodiment.

FIG. 11 is a flowchart illustrating a suspend shifting process of the second embodiment. The steps in the flowchart of FIG. 11 are implemented by, for example, the CPU 27 reading a computer-readable program stored in the HDD 26 to the memory unit 25 and executing it.

The processing of the flowchart is substantially the same as the processing in FIG. 3, but the processes of S1107 and S1110 are different. Therefore, only S1107 and S1110 will be described, and descriptions of the other processes will be omitted.

At S1107, the CPU 27 clears a value set in the wake-up reservation region 1001 of the power control unit 23. This prevents the power control unit 23 from starting a wake-up process by mistake immediately after shifting to a suspend mode.

At S1110, the CPU 27 sets an event ID 901 corresponding to a wake-up factor generated at S1109 to the wake-up reservation region 1001 of the power control unit 23. At S1213 of FIG. 12B (to be described later), the power control unit 23 sets the energization state of each device with reference to the set value on the basis of the table in FIG. 9.

Figure 12A:
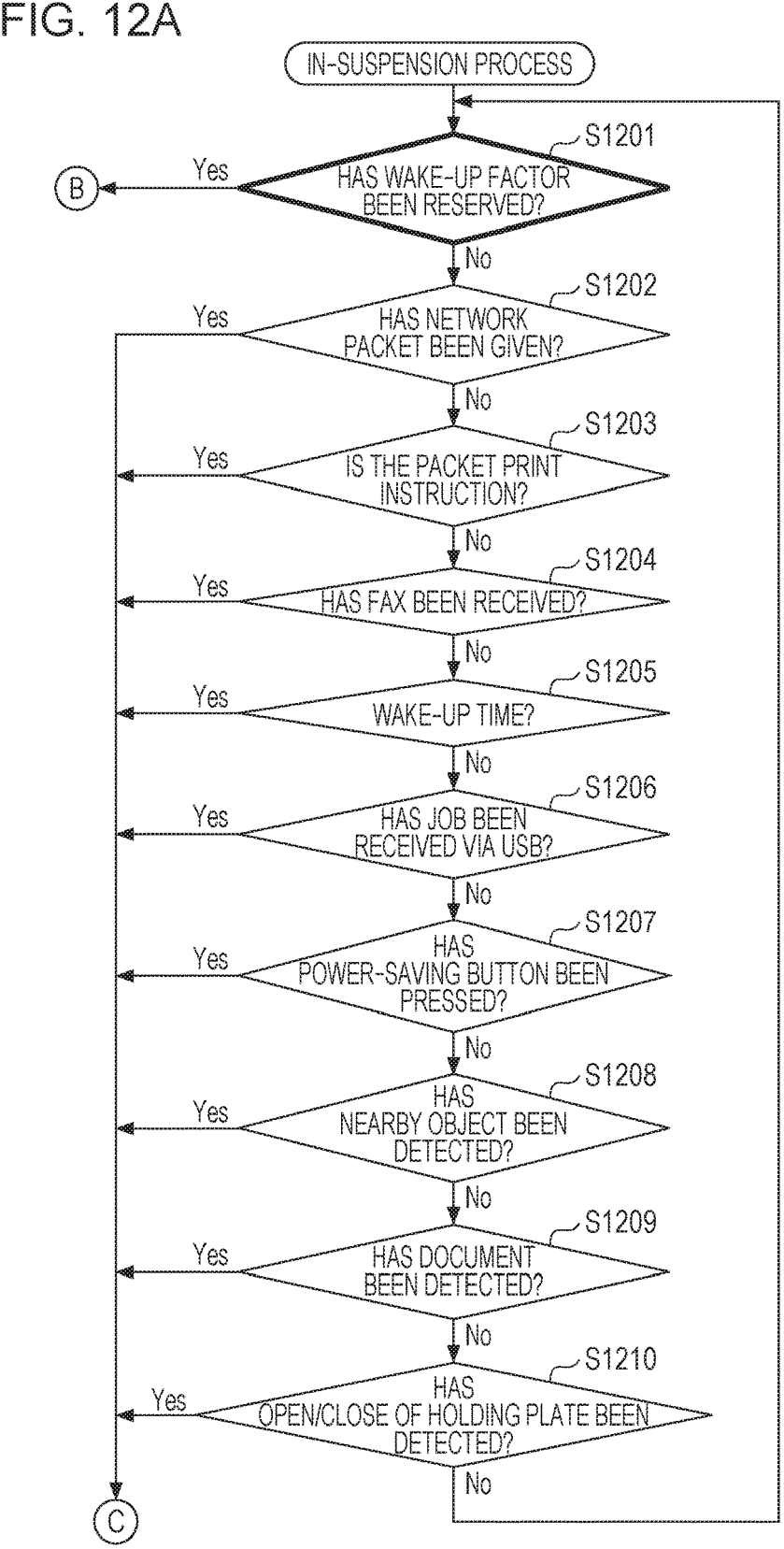
FIGS. 12A and 12B illustrate an in-suspension process of the power control unit according to the second embodiment.
Figure 12B:
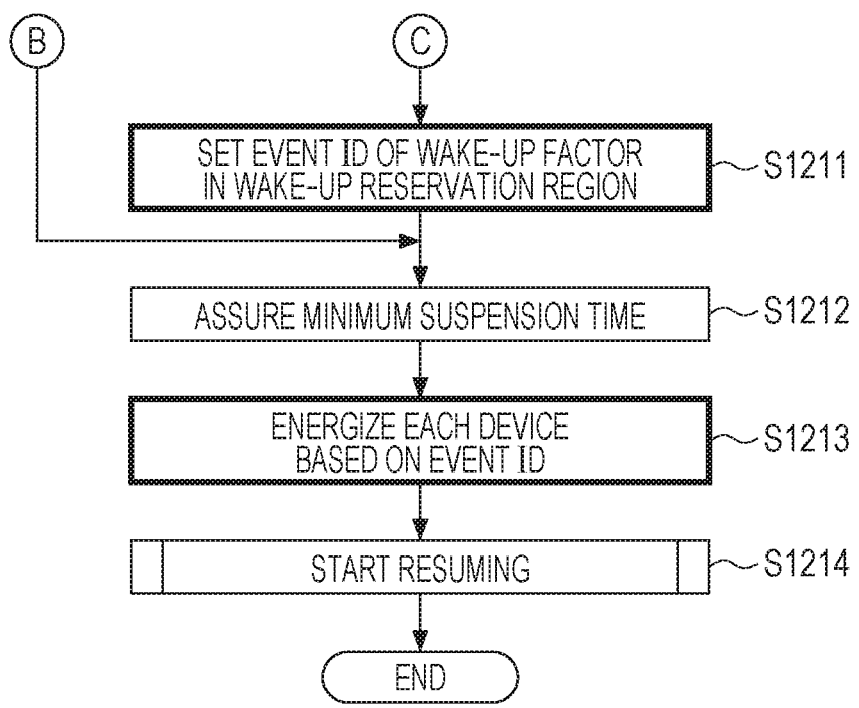

FIGS. 12A and 12B illustrate an in-suspension process of the power control unit 23 according to the second embodiment. This flowchart illustrates a process after the power control unit 23 detects a wake-up factor until each device restores the normal state. In the case where the power control unit 23 incorporates a CPU, the processing of the flowchart is implemented by the CPU of the power control unit 23 reading and executing a program stored in the power control unit 23.

The processing of this flowchart is substantially the same as the processing illustrated in FIG. 3 but differs only in the processes of S1201, S1211, and S1213. Therefore, only S1201, S1211, and S1213 will be described, and descriptions of the other processes will be omitted.

If at S1201 the power control unit 23 determines that a valid event ID 901 is stored in the wake-up reservation region 1001 (S1201: Yes), the power control unit 23 advances the processing to S1212. If it is determined as Yes in the determination processing at any of S1202 to S1210, then at S1211 the power control unit 23 stores an event ID 901 corresponding to the wake-up factor in the wake-up reservation region 1001 and advances the processing to S1212.

At S1213, the power control unit 23 performs energization setting of each device with reference to the event ID 901 stored in the wake-up reservation region 1001 at S1211 or S1110 of FIG. 11 according to the energization state in FIG. 9 corresponding to the referenced event ID 901.

By the above processing, the second embodiment allows each device to be set to a power state based on the event that triggers the wake-up reservation earlier than S803 of the first embodiment.

Figure 13:
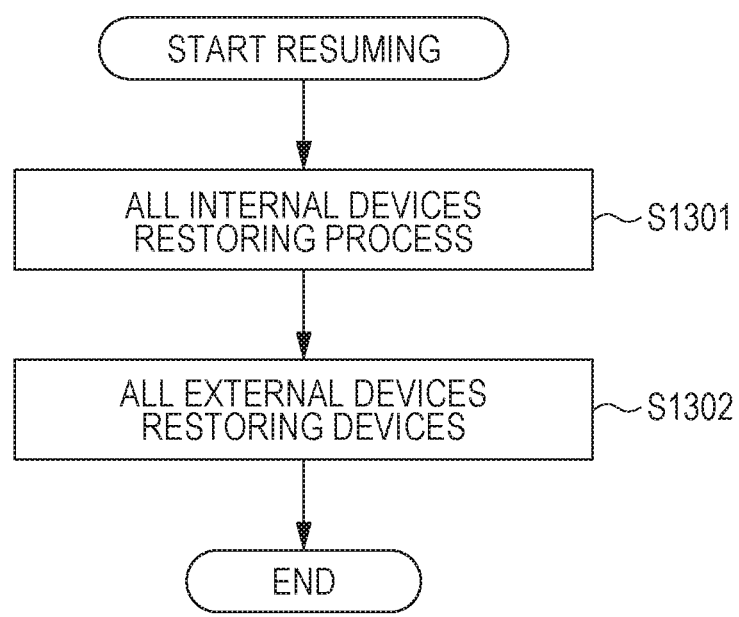
FIG. 13 is a flowchart illustrating a resuming process of the second embodiment.

FIG. 13 is a flowchart illustrating the resuming process of the second embodiment. The CPU 27 returns each external device and each internal device that are terminated to a usable state on the basis of the resuming process illustrated in the flowchart. The steps in the flowchart of FIG. 13 are implemented by, for example, the CPU 27 reading a computer-readable program stored in the HDD 26 to the memory unit 25 and executing it.

The processing of this flowchart is processing in which the energization-state correcting processes of S703 and S704 are removed from the flowchart of FIG. 7. As described above, in the second embodiment, the energization process according to the factor event is executed by the power control unit 23 before the resuming process is started by the CPU 27. This eliminates the need for the processes of S703 and S704 of FIG. 7 in the first embodiment.

Since S1301 and S1302 of FIG. 13 are respectively the same as the process of S701 in FIG. 7 and the process of S702, the details will be omitted.

As described above, the embodiments allow each event to be set to an energization state determined from a wake-up factor event that triggered wake-up reservation even when the device is woken up by wake-up reservation. This prevents excessive energization depending on the wake-up event and reduces energization waiting time in the device initializing process by immediately starting energization.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-252281 filed Dec. 27, 2016, which is hereby incorporated by reference herein in its entirety.

What is claimed is:

1. An information processing apparatus having a power state which includes at least a first power state and a second power state in which less power is consumed than in the first power state, the apparatus comprising:
 a control unit configured to perform a shifting process for shifting the power state from the first power state to the second power state; and
 a power control unit configured to control processing so as to supply power to a module based on a predetermined event generated in the second power state, the module corresponding to the predetermined event,
 wherein, when the predetermined event occurs during the shifting process, the control unit stores information indicating the predetermined event in a storage unit and continues the shifting process, and
 wherein, after the shifting process, the power control unit controls processing so as to supply power to the module corresponding to the predetermined event based on the information stored in the storage unit.

2. The information processing apparatus according to claim 1, further comprising the storage unit,
 wherein the control unit stores the information in the storage unit.

3. The information processing apparatus according to claim 1,
 wherein the control unit comprises a processor configured to control the information processing apparatus, and
 wherein the processor stores the information in the storage unit.

4. The information processing apparatus according to claim 1, wherein, if reservation is made by the control unit, the power control unit shifts the power state from the second power state to the first power state.

5. The information processing apparatus according to claim 4, wherein the control unit reserves restoration from the second power state in a storage unit of the power control unit.

6. The information processing apparatus according to claim 1, further comprising a communicating unit configured to communicate with an external device over a network,
 wherein, when the predetermined event occurs during the shifting process, the communicating unit reserves restoration from the second power state, and
 wherein, reservation is made by the communicating unit, the power control unit shifts the power state of the information processing apparatus from the second power state to the first power state.

7. The information processing apparatus according to claim 4, wherein the power control unit shifts the power state of the information processing apparatus to the first power state after a predetermined time passes from shifting to the second power state.

8. The information processing apparatus according to claim 1, wherein the power control unit controls processing so as to shift the information processing apparatus to the first power state and thereafter supply power to a module corresponding to the predetermined event based on the information stored in the storage unit.

9. The information processing apparatus according to claim 1, wherein the predetermined event is any one of a print instruction from an external device, an access from an external device over a network, reception of FAX data, a wake-up instruction form a timer, an access from an external device via a USB, a user key operation, detection of a person with a human sensor, detection of a document with a document sensor, and detection of open or close of a document holding plate.

10. The information processing apparatus according to claim 1,
 wherein, when the predetermined event occurs during the shifting process and before a predetermined process is completed, the control unit interrupts the shifting process, and
 wherein, when the predetermined event occurs during the shifting process and after the predetermined process is completed, the control unit stores the information indicating the predetermined event in the storage unit and continues the shifting process.

11. The information processing apparatus according to claim 1, further comprising a printing unit configured to print an image on a sheet.

12. The information processing apparatus according to claim 1, further comprising a reading unit configured to read an image on a document.

13. A method for controlling an information processing apparatus having a power state which includes at least a first power state and a second power state in which less power is consumed than in the first power state, the method comprising:
 performing a shifting process for shifting the power state from the first power state to the second power state; and
 supplying power to a module based on a predetermined event generated in the second power state, the module corresponding to the predetermined event,
 when the predetermined event occurs during the shifting process, storing information indicating the predetermined event in a storage unit and continuing the shifting process, and
 after shifting the shifting process, supplying power to the module corresponding to the predetermined event based on the information stored in the storage unit.

14. The method according to claim 13, the method further comprising:
 reserving restoration from the second power state when the predetermined event occurs during the shifting process; and
 shifting the power state of the information processing apparatus from the second power state to the first power state according to the reservation.

15. The method according to claim 14, a processor performs the reservation.

16. The method according to claim 14, wherein a communicating unit that communicates with an external device over a network performs the reservation.

17. The method according to claim 14, wherein the shifting the power state of the information processing apparatus from the second power state to the first power state is executed after a predetermined time passes from shifting to the second power state.

18. The method according to claim 14, wherein the supplying power to the module corresponding to the predetermined event is executed after shifting the power state to the first power state.

19. The method according to claim 13, wherein the predetermined event is any one of a print instruction from an external device, an access from an external device over a network, reception of FAX data, a wake-up instruction form a timer, an access from an external device via a USB, a user key operation, detection of a person with a human sensor, detection of a document with a document sensor, and detection of open or close of a document holding plate.

20. The method according to claim 13, further comprising interrupting the shifting process when the predetermined event occurs during the shifting process and before a predetermined process is completed,
  wherein the continuing the shifting process is executed when the predetermined event occurs during the shifting process and after the predetermined process is completed.

* * * * *